(12) United States Patent
Kuremoto et al.

(10) Patent No.: US 6,732,859 B2
(45) Date of Patent: May 11, 2004

(54) RECORDING MEDIUM DISC STORAGE CASE AND A RECORDING MEDIUM DISC

(75) Inventors: Masaaki Kuremoto, Higashi-Osaka (JP); Kei Kuremoto, Higashi-Osaka (JP)

(73) Assignee: Meiko Kasei Kogyo Kabushiki Kaisha, Higashi-Osaka (JP)

( * ) Notice: Subject to any disclaimer, the term of this patent is extended or adjusted under 35 U.S.C. 154(b) by 0 days.

(21) Appl. No.: 10/075,201

(22) Filed: Feb. 15, 2002

(65) Prior Publication Data

US 2002/0074249 A1 Jun. 20, 2002

Related U.S. Application Data

(63) Continuation of application No. 09/423,298, filed as application No. PCT/JP99/01068 on Mar. 4, 1999.

(30) Foreign Application Priority Data

Mar. 9, 1998 (JP) .......................................... 10-057080

(51) Int. Cl.⁷ ............................................... B65D 85/30
(52) U.S. Cl. ...................... 206/308.1; 206/310; 206/493
(58) Field of Search ...................... 206/308.1, 309–313, 206/493; 220/836, 844, 848

(56) References Cited

U.S. PATENT DOCUMENTS 4,805,770 A * 2/1989 Grobecker et al. ...... 206/308.1
4,903,829 A * 2/1990 Clemens ................... 206/308.1
5,238,107 A * 8/1993 Kownacki ................. 206/308.1
5,788,068 A * 8/1998 Fraser et al. ................. 206/310
5,896,985 A * 4/1999 Nakasuji ................... 206/308.2
6,523,683 B1 * 2/2003 Fraser et al. ............. 206/308.1

FOREIGN PATENT DOCUMENTS

| JP | 8-90610 | * | 4/1996 |
| JP | 09226869 | * | 9/1997 |

* cited by examiner

*Primary Examiner*—Shian Luong
(74) *Attorney, Agent, or Firm*—Oblon, Spivak, McClelland, Maier & Neustadt, P.C.

(57) ABSTRACT

A recording medium disc storage case (1) includes a holding plate (2) for covering a recording side of a recording medium disc (100) having a central hole (101), the holding plate (2) having a holding portion (5) to be removably fitted into the central hole (101) of the disc (100), the holding portion (5) having a base (10) extending from an inner periphery of a perforation (9) defined centrally of the holding plate (2), extensions (12) extending circumferentially from the base (10), and projections (13) each radially outwardly projecting from an end portion of each of the extensions (12), the projections (13) having respective tips defining a circular envelope having a diameter greater than that of the central hole (101) of the disc (100), and the extensions (12) having an outer diameter such as to be fitted in the central hole (101) of the disc (100).

10 Claims, 23 Drawing Sheets

RECORDING MEDIUM DISC STORAGE CASE AND A RECORDING MEDIUM DISC

TECHNICAL FIELD

The present invention relates to a storage case for packaging a recording medium disc having recorded therein a music, image or optically readable digital information for use in a computer.

BACKGROUND ART

One known prior art related to such storage cases for packaging recording medium discs such as CDs, DVDs and LDs is described in Japanese Examined Patent Publication No. HEI 6-51506 (corresponding to U.S. Pat. No. 4,874,085).

This prior art storage case is constructed to support a disc only at its central area free of information carrying tracks and not to contact the area containing information carrying tracks of the disc by providing a predetermined clearance therebetween, so as not to transfer any deformation of the case to the disc.

Thus, this construction requires that the case have a higher rigidity so as to minimize its possible deformation, and make such clearance relatively large. This results in a drawback that the case has a relatively large thickness.

The storage case having an increased thickness involves problems such as a larger storage space needed for such cases and more frequent replenishment of goods on display due to a decreased number of discs which are displayable at a time, for example, in displaying and selling.

Accordingly, a storage case of this type has been desired to have a decreased thickness.

To this end, the art of reducing such clearance by supporting a disc at its outer peripheral edge area as well as at its central area, has been developed as disclosed, for example, in Japanese Unexamined Patent Publication No. SHO 60-148485.

Though this art employs a structure for supporting the disc at both the central and outer peripheral areas thereof, other structures, particularly for holding the central hole portion of the disc, remain conventional and, hence, it is impossible to decrease the thickness of the storage case as desired.

Typically known such structure for holding the central hole portion of a disc is described, for example, in Japanese Examined Utility Model Publication No. HEI 3-31748.

This conventional structure includes a boss portion to be fitted into the central hole of the disc, the boss portion defining a multiplicity of radially extending slits which are circumferentially equally spaced from each adjacent one. These slits form elastic pieces adapted to support the central area of the disc elastically.

With this structure the projecting amount of the boss portion to project from the upper side of the disc held by the boss portion is required to be relatively large so as to prevent an unexpected removal of the disc from the boss portion. For this reason it has been difficult to make the storage case thinner.

Also, this central hole portion holding structure has been desired to allow the disc to be removed by a simple operation as well as to hold the disc securely.

Although this conventional structure is capable of securely holding the disc by means of the multiplicity of elastic pieces for elastically supporting the disc, the removal of the disc therefrom is not easy because an increased pressing force is required to depress the elastic pieces for the removal.

Further, since constantly biasing the periphery of the central hole of the disc with an increased pressing force for secure holding is likely to cause the disc to warp, the holding structure has been desired to support the disc with a smallest possible force.

This means that the structure for holding the central hole portion of the disc has been desired to satisfy incompatible requirements: holding the disc with a smaller force, holding the disc securely, and allowing the disc to be removed by a simple one-touch operation.

In view of these requirements a storage case has been devised having a reduced number of elastic pieces located at three circumferential points and enabling a one-touch removal of a disc, as disclosed, for example, in German Patent DE3425579.

In this conventional storage case, however, the inner ends of the three elastic pieces are connected to a disc-like push member and, hence, a force working on this push member also works on the three elastic pieces at the same time. Accordingly, an increased force is required to deform these elastic pieces.

In addition, this storage case requires a compressed elastic element, a nip protuberance and the like for ensuring a one-touch removal of the disc, which makes the construction more intricate, thus resulting in a difficulty in making the storage case thinner.

DISCLOSURE OF THE INVENTION

It is an object of the present invention to provide a storage case having a thickness of about a half of the thickness of a conventional storage case.

Another object of the present invention is to provide a storage case which is capable of holding a disc at its central hole portion with a reduced force, holding the disc securely, and allowing the disc to be removed therefrom by a one-touch operation.

Other objects of the present invention include: to ease the operations of opening and closing the storage case; to prevent the storage case from being damaged; to facilitate the removal of the storage case from a storage rack or the like; to simplify the construction of a mold for manufacturing the storage case; and so forth.

To attain the above objects, the present invention provides the following means.

That is, the present invention provides a recording medium disc storage case comprising a holding plate for covering a recording side of a recording medium disc having a central hole, the holding plate having a holding portion to be removably fitted into the central hole of the disc, the holding portion including a base extending from an inner periphery of a perforation defined centrally of the holding plate, extensions extending circumferentially from the base, and projections each radially outwardly projecting from an end portion of each of the extensions. The projections have respective tips defining a circular envelope having a diameter greater than that of the central hole of the disc, and the extensions have an outer diameter such as to be fitted in the central hole of the disc.

In this construction according to the present invention, each projection is located at a position circumferentially displaced from the base portion.

Preferably, the base includes a plurality of base portions circumferentially spaced a predetermined distance from one another which are inclined radially inwardly and axially upwardly from the inner periphery of the perforation of the holding plate, each of the extensions is concentrically extending in one circumferential direction from an inner end portion of each base portion and is formed at its end portion with a push portion extending radially inwardly, and each of the projections is located on an upper edge portion of the end portion of each extension.

In the above construction the base and the extensions are elastically deformably arranged such that when the holding portion is fitted in the disc, the projections are located on an upper side of the disc, while when the push portions are depressed, the projections move to a lower side of the disc.

With this construction, each projection is located at a position displaced radially, circumferentially and axially from the corresponding base portion, whereby the amount of move of each projection in response to a depression of the corresponding push portion can be maximized. This allows each projection to move from the upper side to lower side of the disc with ease. Further, since each projection operates independently of other projections in response to the depression of the corresponding push portion, only a very small force is required for such depressing operation. Thus, the disc can be fitted on and removed from the holding portion with extreme ease.

Preferably, the projecting amount of each projection is determined such that a click sound is produced upon fitting of the disc on the holding portion or upon release of the disc from its fitting condition by depressing the push portions. This feature enables the user to confirm the fitting and removal of the disc readily.

The projections are preferably disposed at circumferentially trisecting locations. While a smaller number of projections enables easier removal of the disc, the number of projections is not limited to three but may be two to six at circumferentially equally dividing locations.

It is preferred that the upper surfaces of the projections form a top surface of the holding portion, and that when the holding portion is fitted into the disc, the distance between the upper side of the disc and the top surface of the holding portion be not greater than the thickness of the disc. By determining the dimensions of the holding portion as such, it is possible to reduce the amount of move from the upper side to lower side of the disc required of each projection.

The outer diameter of the extensions is preferably such as to be fitted in the central hole of the disc with a slight backlash. By holding the disc with a backlash the disc can be prevented from deforming.

The holding plate preferably has a central support portion and a peripheral support portion for respectively supporting central and peripheral portions situated out of the recording area of the disc. By thus supporting the two portions of the disc it is possible to minimize the clearance between the recording surface of the disc and the confronting surface of the holding plate thereby making the whole storage case thinner.

The holding plate may have an upper face adapted to confront the disc and a reverse face on the opposite side of the upper face, the reverse face being flat except the area of the holding portion, the upper face being formed with a peripheral wall having a predetermined thickness and protruding from a peripheral area thereof and an arcuated wall having a predetermined thickness and protruding from an area adapted to surround the outer periphery of the disc.

With this construction the peripheral wall and the arcuated wall provide a rib effect to enhance the rigidity of the holding plate. This also makes it possible to thin the holding plate.

Thus, according to the present invention it is possible to reduce the thickness of the holding plate from the reverse face thereof to the top surface of the holding portion to 4 mm or less.

The holding plate may be contained in an openable case. Alternatively, it is possible that a cover member is pivotally supported directly on the holding plate to form a storage case.

Specifically, the holding plate may pivotally support the cover member through a hinge portion for opening and closing the cover member.

The holding portion preferably has a top surface which abuts an inner surface of the cover member or defines a clearance less than the thickness of the disc therebetween when the cover member is in its closed position. This enables the storage case to have a thickness of not greater than 6 mm when the holding plate and the cover member are closed relative to each other.

The cover member is preferably larger than the holding plate so as to cover the holding plate completely. By making the cover member larger than the holding plate it is possible to prevent penetration of dust into the storage case effectively.

Preferably, the cover member has an outer peripheral edge which partially juts out from an outer peripheral edge of the holding plate when the cover member is in its closed position over the holding plate, and the jutting portion is provided with a finger hook portion. The provision of the finger hook portion allows the user to remove the storage case out of a custody rack by hooking the finger hook portion with a finger thereby facilitating the removal of the storage case from the custody rack.

It is preferred that the cover member have a free edge portion defining a notch on the opposite side of the hinge portion, and that a portion of the holding plate corresponding in position to the notch of the cover member in its closed position be provided with a finger engaging portion. This feature allows the user to catch the finger engaging portion with a finger for opening the cover member even though the storage case is thin, thereby facilitating the opening and closing of the storage case.

The holding plate and the cover member may have respective abutting portions which come to abut each other when the cover member is opened 180° relative to the holding plate to maintain the open condition. These abutting portions may be configured to allow the holding plate and the cover member to further pivot relative to each other when a force is exerted to open the cover member further from the 180° open condition.

The storage case with such feature is prevented from any damage even if it is opened with an unexpectedly large force. In contrast a conventional storage case is provided with a stopper for the storage case not to open more than 180° and, hence, is subject to damage when it is opened with a large force.

The holding plate and the cover member may have hinge-connected edge portions hinged to each other on one side thereof, free edge portions on the other side, and upper and lower edge portions which are opposite to each other via the hinge-connected edge portions and free edge portions, the upper and lower edge portions of the holding plate and cover member each having a peripheral wall rising thicknesswise of the storage case, the peripheral wall of one of the holding plate and the cover member having a protuberance projecting therefrom, the corresponding peripheral wall of the other having a recess to be removably fitted over the protuberance when the cover member is closed, the holding plate and the cover member each having a communication aperture extending through the thickness thereof to open upon the protuberance or the recess.

The provision of the communication aperture enables the use of a two-part mold comprising upper and lower mold parts for manufacturing a plastic storage case thereby reducing the manufacturing time and cost required. It should be noted that a conventional mold for manufacturing a conventional storage case free of any such aperture is a four-part mold comprising upper and lower mold parts and right and left lateral mold parts.

Preferably, the peripheral wall of one of the holding plate and the cover member is formed with a positioning protrusion adjacent the protuberance or recess for fit in the counterpart peripheral wall of the other. Such a positioning protrusion optimizes the positioning of the cover member and holding plate relative to each other and the engagement between the recess and the protuberance thereby making the opening and closing operations smooth.

The hinge portion comprises a pair of hinge pieces protruding from one of the holding plate and the cover member, a hinge shaft projecting from each of opposing inner surfaces of the pair of hinge pieces, and a bearing portion provided on the other for removably and pivotally supporting the hinge shaft. The bearing portion defines a hole receiving a tip portion of the hinge shaft for rotation and a notch receiving a half of the circumference of a base end portion of the hinge shaft and exposing the other half of the circumference.

Unlike a conventional storage case which is subject to damage at its hinge portion, the storage case employing the hinge structure according to the present invention has an enhanced strength at the hinge portion thereof and hence is prevented from damage.

Preferably, the holding plate and the cover member have hinge-connected edge portions hinged to each other on one side thereof, free edge portions on the other side, and upper and lower edge portions which are opposite to each other via the hinge-connected edge portions and free edge portions, the upper and lower edge portions of the cover member each having a peripheral wall which rises thicknesswise of the storage case and formed with a label holding claw projecting from the peripheral wall, the cover member defining a communication aperture extending through the thickness thereof to open upon the label holding claw. The provision of the communication aperture enables the use of a two-part mold comprising upper and lower mold parts for molding the cover member and hence is advantageous in terms of manufacturing and cost rather than the use of a conventional four-part mold.

According to the present invention it is possible to provide a thinner storage case and allow the user to put and remove a recording medium disc into and out of the storage case with a single hand in a mere one-touch operation.

BEST MODE FOR CARRYING OUT THE INVENTION

Embodiments of the present invention will now be described with reference to the drawings.

Figure 1:
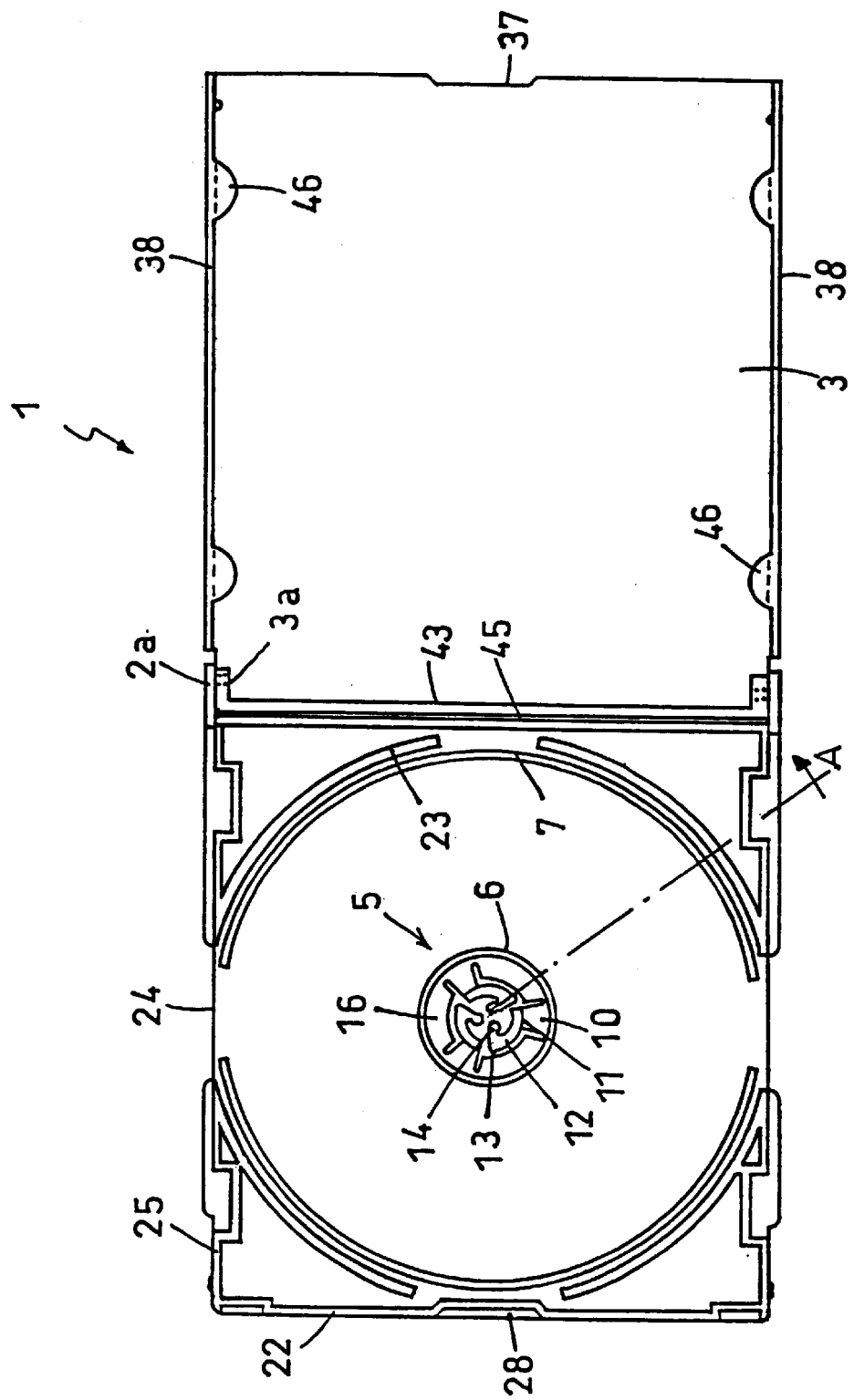
FIG. 1 is a front elevational view illustrating a storage case as a first embodiment of the present invention in an open position.
Figure 2:
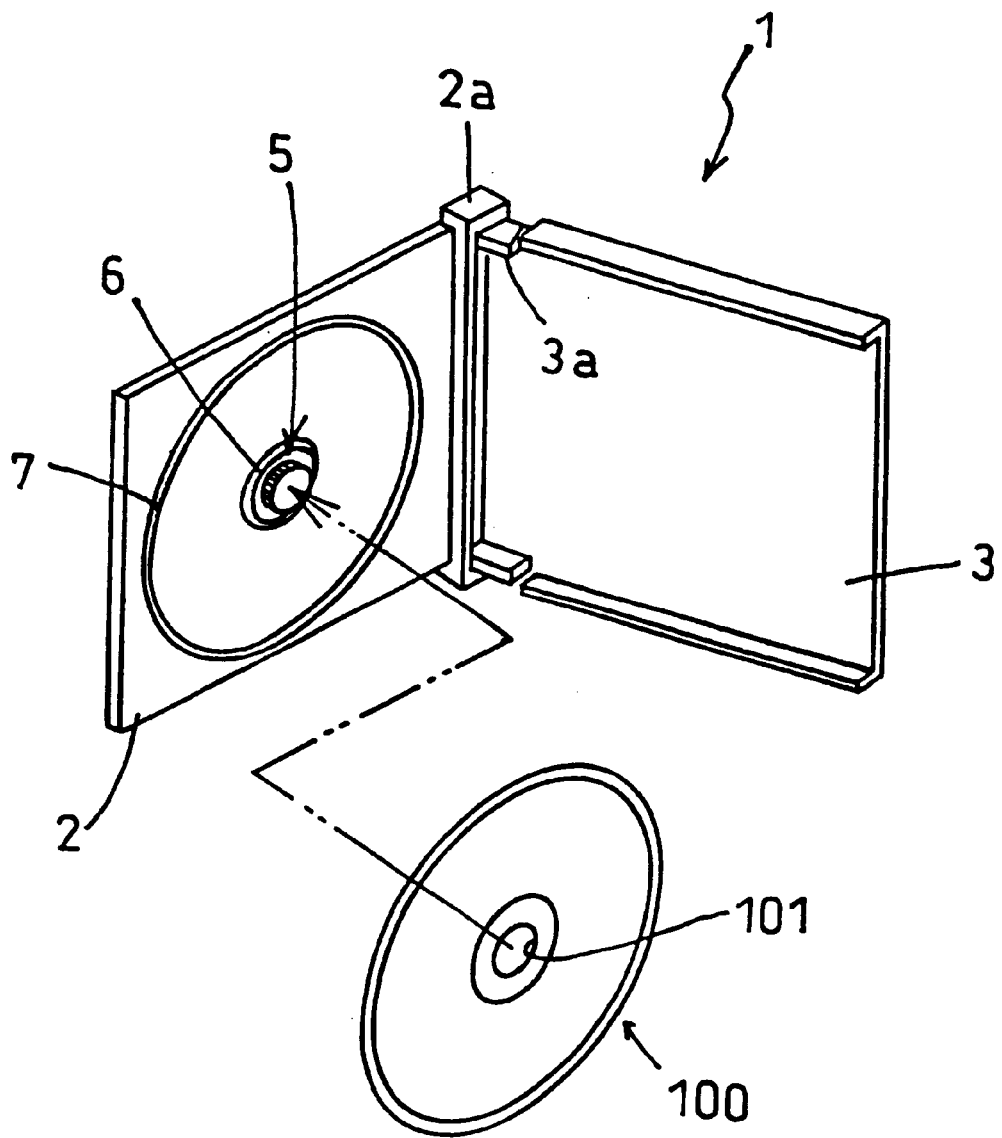
FIG. 2 is a schematic perspective view of the first embodiment.

As shown in FIGS. 1 and 2, storage case 1 according to the present invention includes a holding plate 2 and a cover member 3 which are pivotally connected together through hinge portions 2a and 3a on one side thereof for storing a recording medium disc 100 by covering the opposite sides of the disc 100 with the holding plate 2 and cover member 3. These holding plate 2 and cover member 3 are each formed of a transparent or opaque resin or the like.

The holding plate 2 has a holding portion 5 in a generally central area thereof to be fitted in central hole 101 of the disc 100. The holding plate 2 also has a central support portion 6 which is annularly raised to enclose the holding portion 5, and a peripheral support portion 7 which is annularly raised to enclose the area surrounding the central support portion 6.

Figure 3:
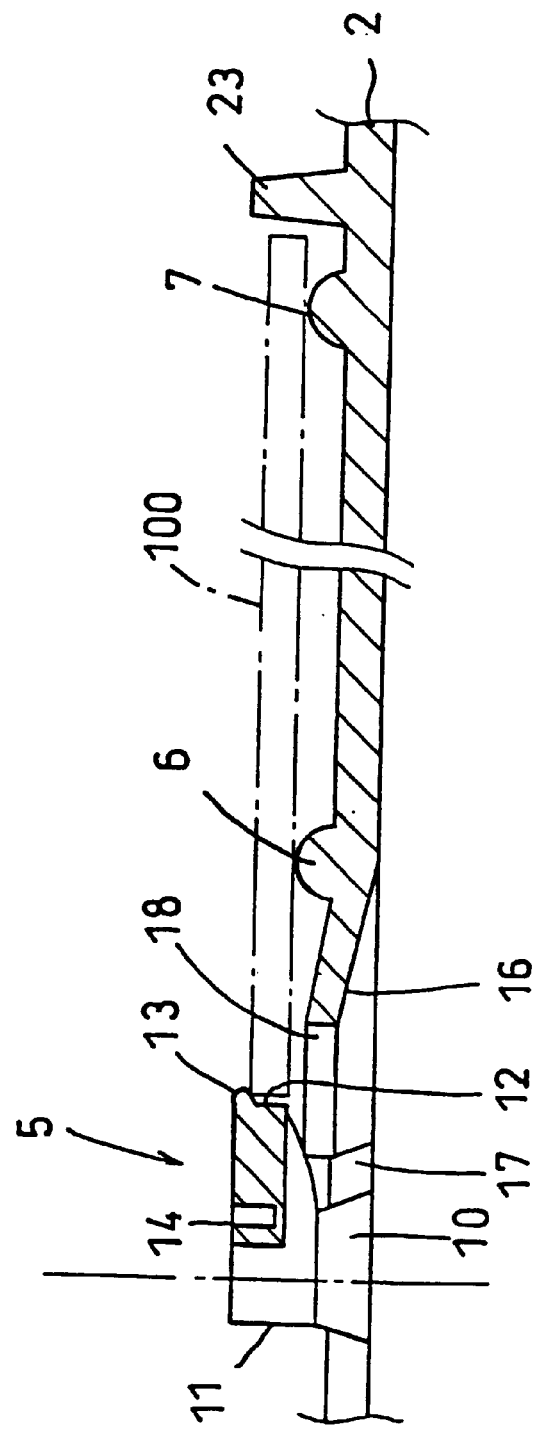
FIG. 3 is a sectional view taken on line 3—3 in FIG. 1.

These central and peripheral support portions 6 and 7 are capable of abutting the recording side of the disc 100 at areas other than the recording area of the disc 100 as shown in FIG. 3. Although not shown, the recording area of the disc 100 is a toroidal area other than the central and peripheral areas of the disc 100.

Each of the support portions 6 and 7 can be raised to 1 mm or less, and in this embodiment they are raised to about 0.7 mm.

As shown in FIGS. 3 to 6, the holding portion 5 includes a base portion 10 extending from the inner periphery of a perforation 9 defined in a central area of the holding plate 2, extensions 12 extending circumferentially from the base portion 10, and a projection 13 radially outwardly projecting from an end portion of each extension 12. The projections 13 have respective tips defining a circular envelope having a diameter greater than that of the central hole 101 of the disc 100, and the extensions 12, as a whole, have an outer diameter such as to be fitted in the central hole 101 of the disc 100.

In this arrangement of the present invention each projection 13 is located as circumferentially displaced from the base portion 10.

More specifically, the base portion 10 is inclined radially inwardly and axially upwardly from the inner periphery of the perforation 9 and is provided at plural locations circumferentially spaced a predetermined distance from one another. Each of the extensions 12 is concentrically extending in one circumferential direction from an inner end portion of the corresponding base portion 10 through an upright portion 11 rising axially. A push portion 14 is provided extending radially inwardly from an end portion of each extension 12. The projection 13 is located on an upper edge portion of the end portion of each extension 12.

The perforation 9 defined centrally of the holding plate 2 substantially coincides with the inner periphery of the central support portion 6.

The push portions 14 are separated from each other by a separating portion 15 and hence can be operated independently of each other.

A dust-stop section 16 is provided between each pair of circumferentially adjacent base portions 10. This dust-stop section 16 is formed integrally with the inner periphery of the perforation 9 and protrudes therefrom with an inclination equal to that of the base portions 10. Each circumferential end of the dust-stop section 16 is separated from each adjacent base portion 10 by a radial notch 17, and the radially inner edge portion of the dust-stop section 16 is separated from the adjacent extension 12 by a circumferential notch 18.

This dust-stop section 16 prevents dust from penetrating into the holding portion 5. In the event dust penetrates into the holding portion 5, the central support portion 6 keeps the dust from reaching the recording side 102 of the disc 100 thereby protecting the disc 100.

In this embodiment the base portions 10 are disposed at circumferentially trisecting locations and, hence, the projections 13 and the push portions 14 are also disposed at circumferentially trisecting locations but circumferentially displaced with respect to the corresponding base portions 10. Each push portion 14 is shiftable within a very large axial extent of about 2 mm (thicknesswise of the holding plate 2). Even when the push portion 14 is largely depressed to such an extent, the corresponding extension 12 and base portion 10 are elastically deformed without any damage.

Where storage cases of this type are formed of a transparent PS resin not mixed with a high-impact PS resin, such storage cases have a very limited spring property due to the low fracture strength of the PS resin. Therefore, it has been practically difficult to impart such cases with a satisfactory spring property for enabling the one-touch removal of a disc such as a CD or a DVD. The unique construction of the holding portion 5 situated centrally of the storage case according to the present invention overcomes such a difficulty and makes it possible to enjoy a satisfactory spring property.

Figure 6:
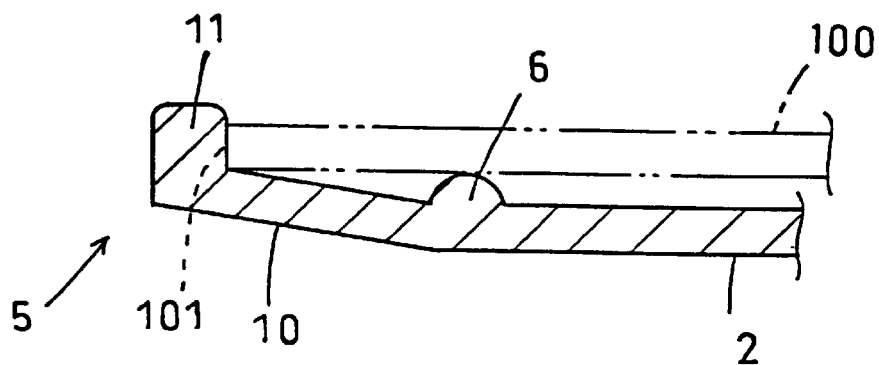
FIG. 6 is an enlarged sectional view taken on line C—C in FIG. 4.

Specifically, as shown in FIG. 6, the base portions 10 are inclined such that as they extend inwardly they become higher with respect to the flat surface of the holding plate 2, and this inclination provides a bendable range.

Figure 9:
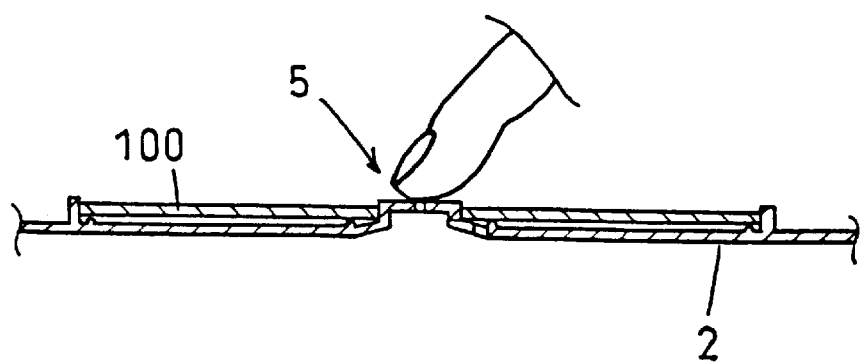
FIG. 9 is a sectional view illustrating an operation of depressing the holding portion in removing the recording medium disc.

Thus, when a depressing force works on the push portions 14 to depress the holding portion 5 as shown in FIG. 9, there occur a radially inward inclination of each upright portion 11, a flexing of each extension 12, a flexing of each base portion 10, and the like. This results in sinking and diameter-reducing actions of the holding portion 5 as a whole.

Since these sinking and diameter-reducing actions occur against the elastically restoring force, the holding portion 5 naturally rises to cancel its sinking and expands to cancel its diameter-reducing action when the depressing operation against the push portions 14 ceases.

The projections 13 projecting radially outward are each located at the extension terminating end portion of the corresponding extension 12, or stated otherwise at a root portion of the corresponding push portion 14.

These projections 13, when in their normal state, interfere with the peripheral edge of the central hole 101 of the disc 100, or obstruct the fitting of the holding portion 5 into the central hole 101.

This is because the tips of the projections 13 define a circular envelope having a diameter greater than that of the central hole 101 of the disc 100. More specifically, the diameter of the envelope is greater by about 0.2 mm than the diameter, 15 mm, of the central hole 101. The upright portions 11 and the extensions 12, as a whole, have an outer diameter such as to be fitted in the central hole 101 of the disc 100. In this embodiment the outer diameter is slightly smaller, specifically by about 0.1 mm, than the diameter of the central hole 101.

The base portions 10, extensions 12 and upright portions 11 are elastically deformably arranged such that when the holding portion 5 is fitted in the disc 100, the projections 13 are located on the upper side of the disc 100, while when the push portions 14 are depressed, the projections 13 move to the lower side of the disc 100.

Preferably, the projecting amount of each projection 13 is determined such that a click sound is produced upon fitting of the disc 100 on the holding portion 5 and upon release of the disc 100 from its fitting condition by depressing the push portions 14.

The upper surfaces of the projections 13 form a top surface of the holding portion 5, and when the holding portion 5 is fitted in the disc 100, the distance from the upper side of the disc 100 to the top surface of the holding portion 5 is smaller than the thickness of the disc 100. Specifically, the disc 100 has a thickness of 1.2 mm, whereas the distance between the upper side of the disc 100 and the top surface of the holding portion 5 is about 0.5 mm. This means that the projections 13 have a thickness of about 0.5 mm.

The distance from the reverse face of the holding plate 2 to the top surface of the holding portion 5 is preferably about 4 mm. In this embodiment the distance is about 3.8 mm.

The distance between the underside of the projections 13 and the upper surface of the central support portion 6 is generally equal to or slightly greater than the thickness of the disc 100.

Figure 10:
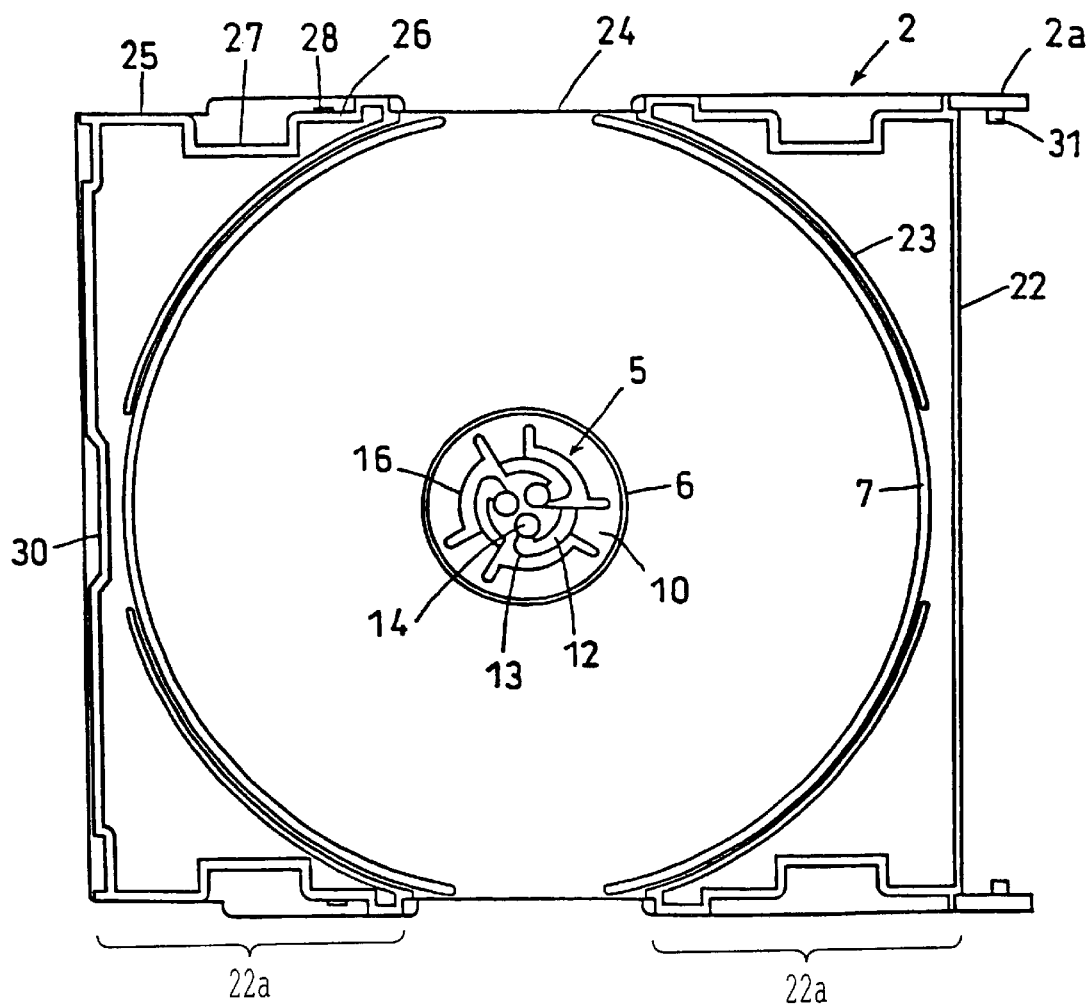
FIG. 10 is a plan view of a holding plate.
Figure 11:
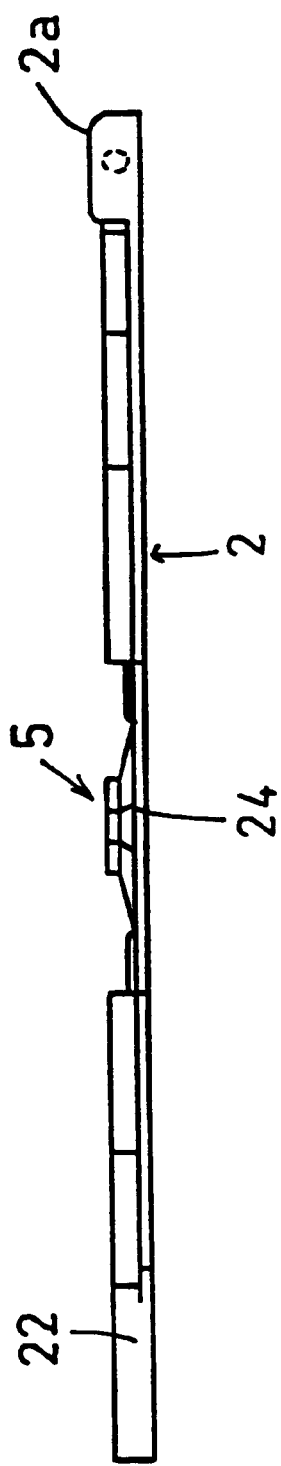
FIG. 11 is a side view of the holding plate.
Figure 12:
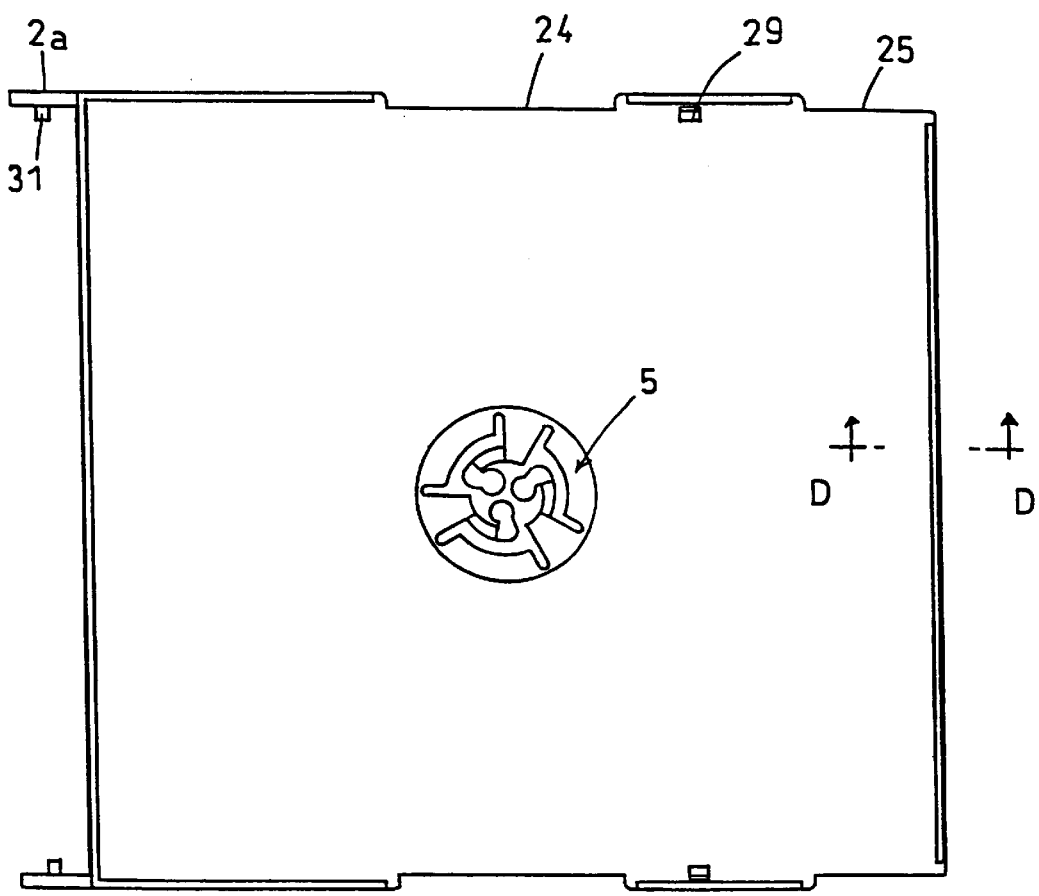
FIG. 12 is a bottom view of the holding plate.

Referring to FIGS. 10 to 12, the holding plate 2 is shaped rectangular having a hinge-connected edge portion with a hinge portion 2a, a free edge portion on the opposite side of the hinge-connected edge portion, and upper and lower edge portions which are opposite to each other via the hinge-connected edge portion and the free edge portion.

Figure 13:
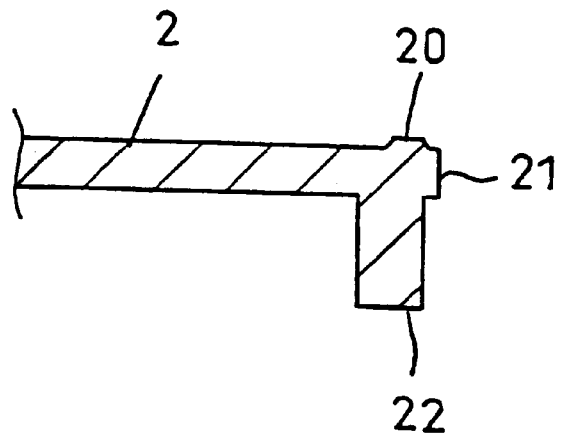
FIG. 13 is a sectional view taken on line D—D in FIG. 12.

The holding plate 2 has an upper face adapted to confront the disc 100, and a reverse face on the opposite side of the upper face, the reverse face being flat except the area of the holding portion 5. The reverse face of the holding plate 2 is formed in an outer edge portion thereof with a reverse side rib 20 raised slightly therefrom as shown in FIG. 13. Also, a side rib 21 is formed on a side face of the holding plate 2.

The upper face of the holding plate 2 is formed with a peripheral wall 22 having a predetermined thickness and protruding from a peripheral edge portion thereof and an arcuated wall 23 having a predetermined thickness and protruding from an area surrounding the outer periphery of the disc 100 fitted on the holding portion 5. The ribs 20 and 21, peripheral wall 22 and arcuated wall 23 serve to reinforce the holding plate 2 thereby contributing to the thinning of the holding plate 2.

The peripheral wall 22 in each of the upper and lower edge portions is centrally split by a predetermined spacing, and the end of each wall segment of the peripheral wall 22 thus split is indiscreetly connected to the arcuated wall 23. A central indentation 24 is defined at the location where the peripheral wall 22 is split so as to serve as a relief in removing the disc 100. The portions of the peripheral wall 22 between the ends of the holding plate 2 and the arcuated wall 23 comprise short wing portions 22a.

Further, each of the upper and lower edge portions of the holding plate 2 has an end indentation 25 on the free edge portion side.

The peripheral wall 22 in each of the upper and lower edge portions of the holding plate 2 is formed into a stepped portion having a first step portion 26 shallowly and inwardly stepped from the corresponding edge portion and a second step portion 27 further inwardly stepped than the first step portion 26. The first step portion 26 defines an engagement recess 28.

Figure 14:
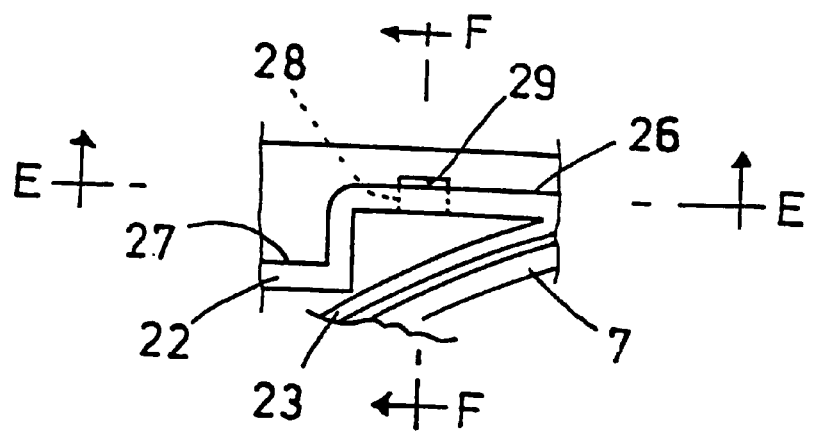
FIG. 14 is a fragmentary enlarged view showing in detail a portion around an engagement recess.
Figure 15:
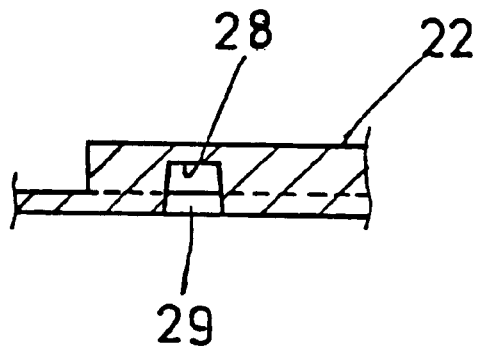
FIG. 15 is a sectional view taken on line E—E in FIG. 14.
Figure 16:
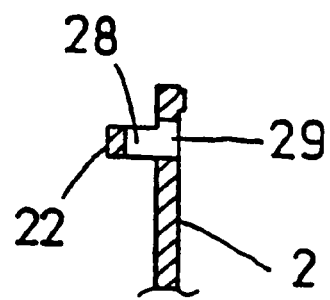
FIG. 16 is a sectional view taken on line F—F in FIG. 14.

As shown in FIGS. 14 to 16, the holding plate 2 has a communication aperture 29 extending through the thickness thereof to open upon the engagement recess 28. The provision of such a communication aperture enables the use of a two-part mold comprising upper and lower mold parts for molding the holding plate 2.

Conventionally, a four-part mold comprising upper and lower mold parts and right and left lateral mold parts has been used to mold a holding plate of the conventional type since such a conventional holding plate does not have such a communication aperture. The holding plate 2 with the communication aperture 29 can be molded by the two-part mold.

Further, the peripheral wall 22 on the free edge portion of the holding plate 2 is inwardly indented in a midway portion thereof, and this indentation is herein termed a finger engaging portion 30 on which a finger of the user is to be put for opening and closing the storage case 1.

The aforementioned hinge portion 2a comprises a hinge piece protruding from each of upper and lower end portions of the hinge-connected edge portion, and a hinge shaft 31 projecting from each of the opposing inner surfaces of the hinge pieces. The hinge piece is sufficiently thick to ensure an enhanced strength.

Figure 17:
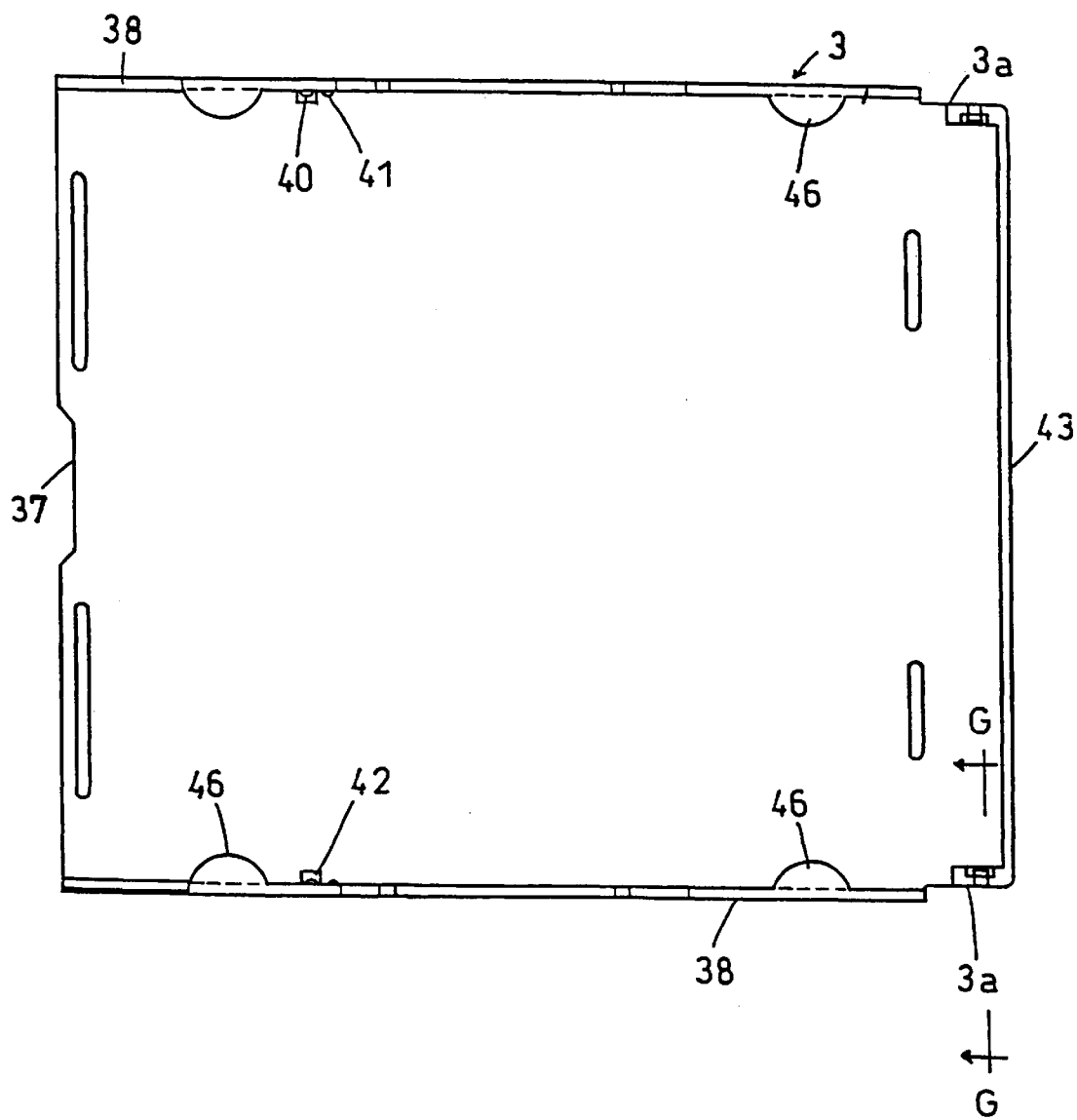
FIG. 17 is a plan view showing the inner side of a cover member.
Figure 18:
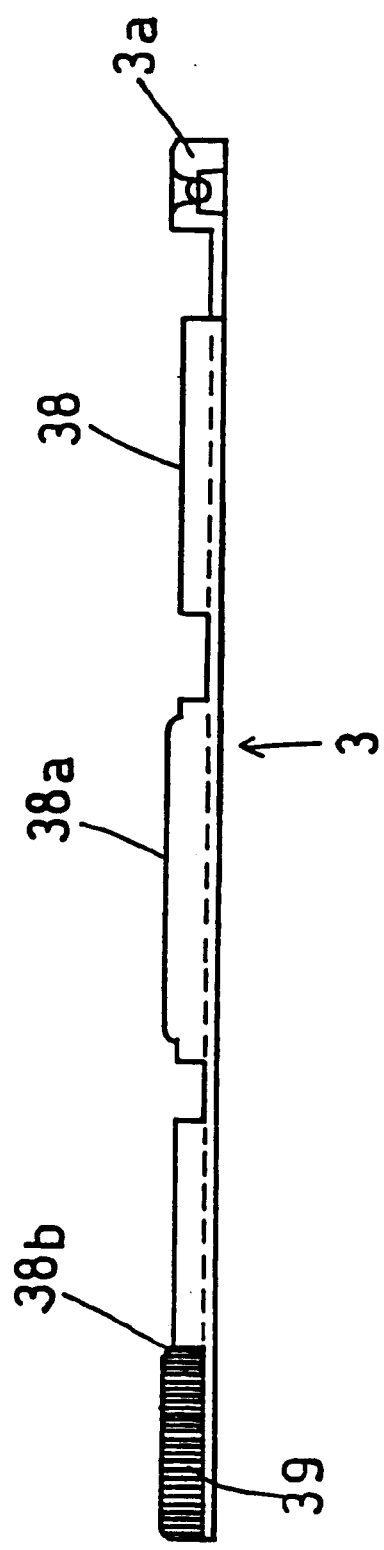
FIG. 18 is a side view of the cover member.
Figure 19:
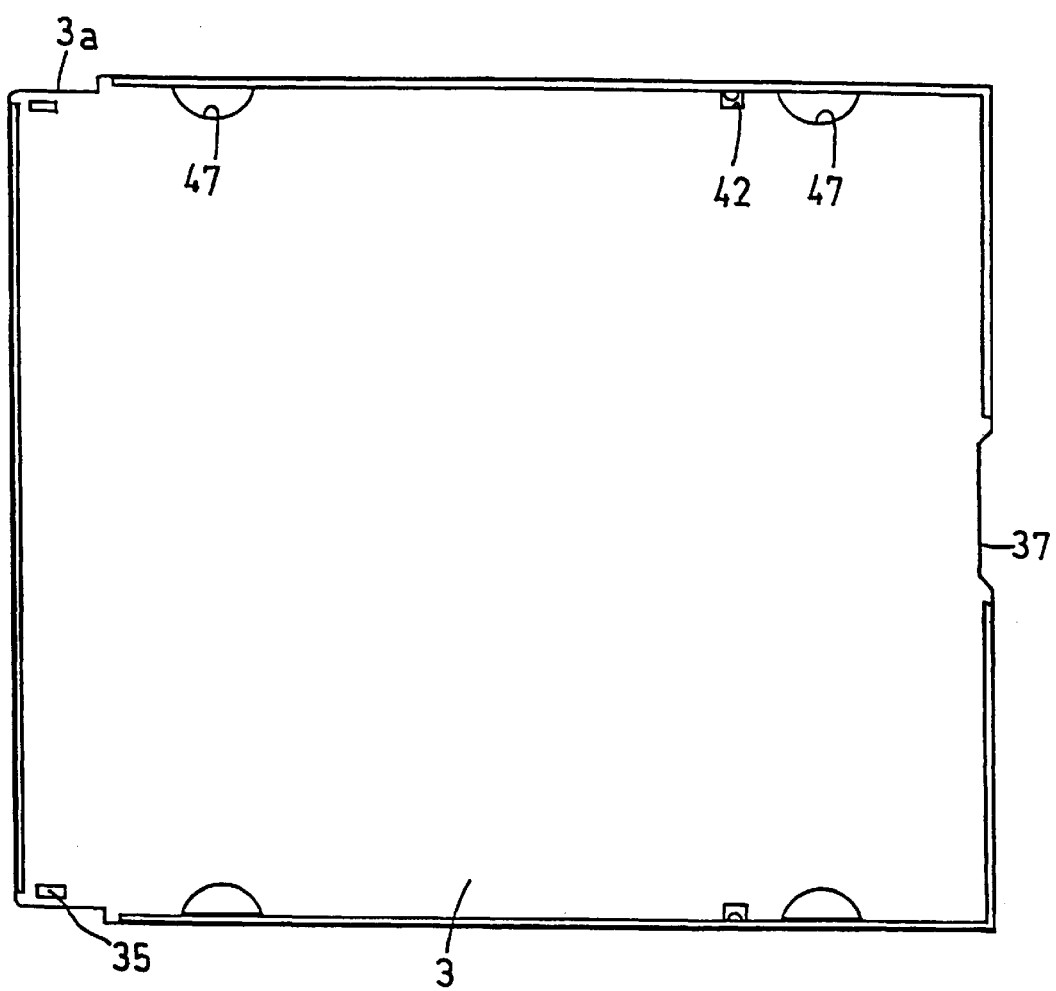
FIG. 19 is a plan view showing the outer side of the cover member.

FIGS. 17 to 19 show the cover member 3 in detail. The cover member 3 is shaped rectangular having a hinge-connected edge portion on one side thereof which is hinged to the counterpart edge portion of the holding plate 2, a free edge portion on the opposite side of the hinge-connected edge portion, and upper and lower edge portions which are opposite to each other via the hinge-connected edge portion and free edge portion.

Upper and lower end portions of the hinge-connected edge portion of the cover member 3 define respective indentations receiving the hinge portion 2a of the holding plate 2 which are formed with a hinge portion 3a of the cover member 3.

Figure 20:
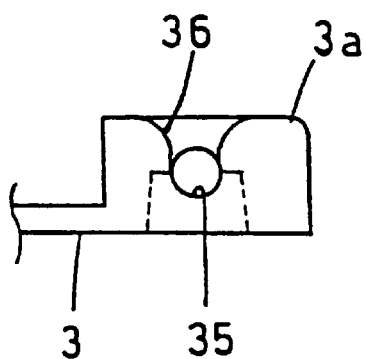
FIG. 20 is a fragmentary enlarged view showing a hinge portion of the cover member.
Figure 21:
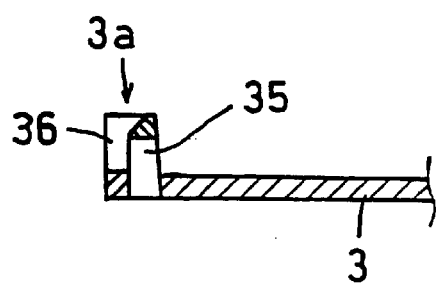
FIG. 21 is a sectional view taken on line G—G in FIG. 17.

As shown in FIGS. 20 and 21, the hinge portion 3a of the cover member 3 is formed into bearing portions which removably engage and pivotally support the corresponding hinge shafts 31 of the hinge portion 2a of the holding plate 2.

Each bearing portion defines a hole 35 receiving the tip portion of the corresponding hinge shaft 31 for pivotal movement and a notch 36 receiving a half of the circumference of the base end portion of the hinge shaft 31 and exposing the other half of the circumference. The hole 35 opens also on the front side of the cover member 2.

The free edge portion of the cover member 3 defines an indentation 37 in a vertically midway portion thereof which corresponds to the finger engaging portion 30 of the holding plate 2.

The upper and lower edge portions of the cover member 3 are each formed with a peripheral wall 38 rising thicknesswise of the case 1.

As shown in FIG. 18, central portion 38a and free edge side portion 38b of the peripheral wall 38 are higher than the rest. These central portion 38a and free edge side portion 38b are adapted to fit the central indentation 24 and end indentation 25 of the holding plate 2, and the height of these portions 38a and 38b defines the thickness of the storage case 1. The free edge side portion 38b has a knurled portion 39 on an outer surface thereof to prevent slippage in opening and closing the cover member 3.

The peripheral wall 38 is formed with an engagement protuberance 40 protruding therefrom and with a positioning protrusion 41 adjacent the engagement protuberance 40, the positioning protrusion 41 being less protrusive than the engagement protuberance 40. When the cover member 3 is closed, the engagement protuberance 40 removably engages the engagement recess 28 of the holding plate 2, while the positioning protrusion 41 abuts an inner surface of the peripheral wall 22.

Figure 22:
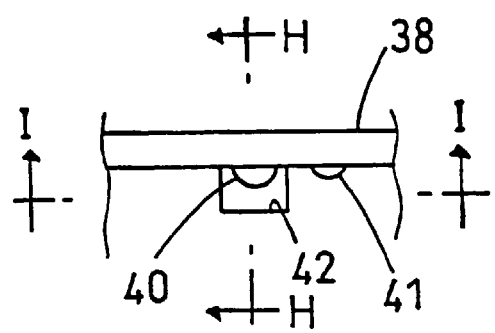
FIG. 22 is a fragmentary enlarged view showing in detail a portion around an engagement protuberance.
Figure 23:
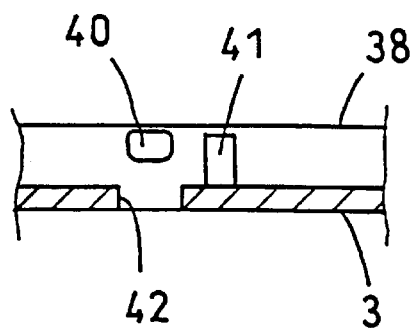
FIG. 23 is a sectional view taken on line I—I in FIG. 22.
Figure 24:
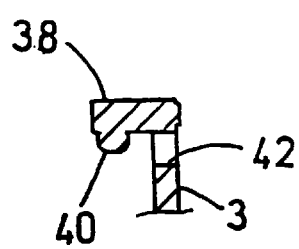
FIG. 24 is a sectional view taken on line H—H in FIG. 22.

FIGS. 22 to 24 show the engagement protuberance 40 and the positioning protrusion 41 in detail. The cover member 3 defines a communication aperture 42 extending through the thickness thereof to open upon the engagement protuberance 40. This communication aperture 42 is formed at a location such that it is closed with an upper surface of the first step portion 26 of the peripheral wall 22 on the holding plate 2 when the cover member 3 assumes its closed position. Thus, dust is prevented from entering the case 1 through the communication aperture 42.

Figure 25:
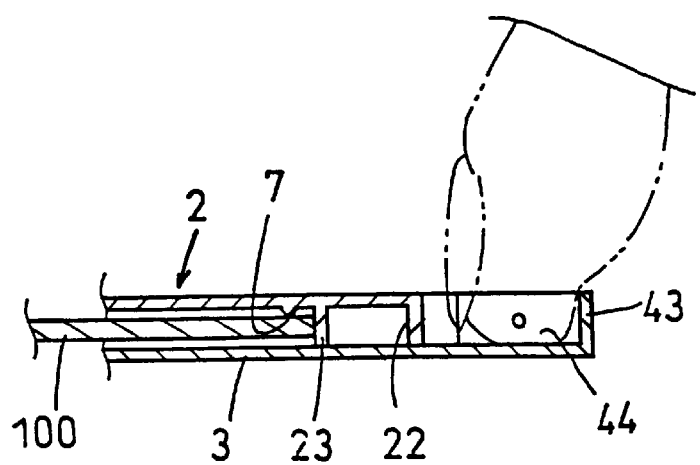
FIG. 25 is a sectional view showing a portion around the hinge portion when the holding plate and the cover member are closed relative to each other.
Figure 26:
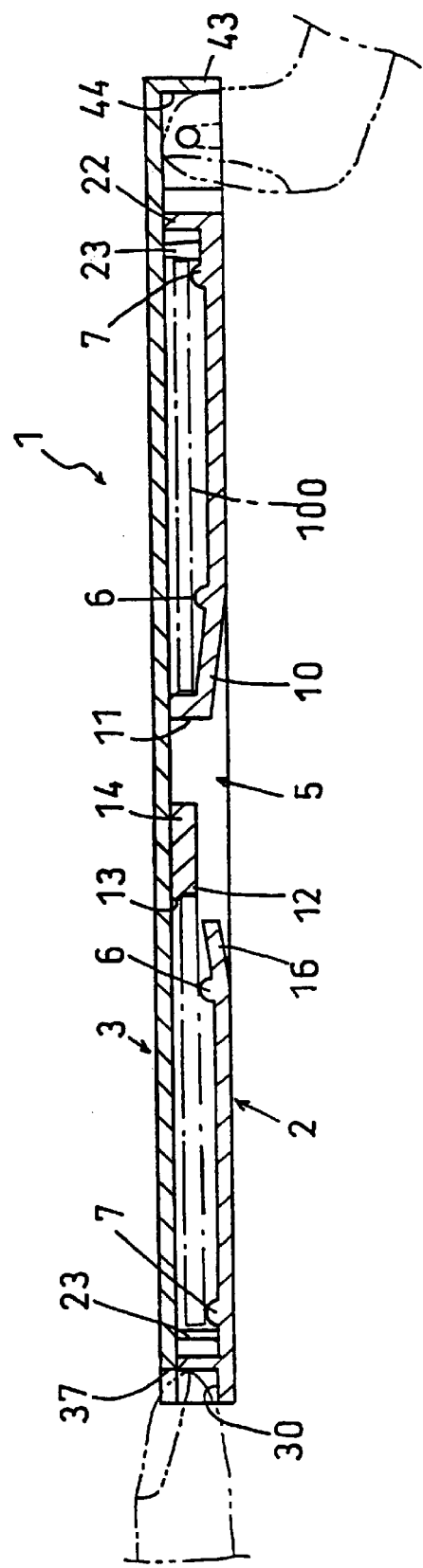
FIG. 26 is a sectional view showing the holding plate and cover member closed relative to each other.

As shown in FIGS. 25 and 26, the cover member 3 is sized greater than the holding plate 2 so as to cover the holding plate 2 completely. More specifically, the outermost edge adjacent the hinge portion 3a of the cover member 3 juts out from the outermost edge adjacent the hinge portion 2a of the holding plate 2 when the cover member 3 assumes its closed position. The jutting edge portion is formed with a peripheral wall 43.

Where the storage case 1 is stored in a case rack (not shown) or the like, this peripheral wall 43 can conveniently be used as a finger hook portion 44 to remove the storage case 1 individually from a case rack or the like. Further, it is possible to affix a label seal (not shown) onto an inner or outer surface of the peripheral wall 43 for indexing purpose.

When the storage case 1 is closed by pivoting the holding plate 2 and the cover member 3 relative to each other about the hinge portions 2a and 3a, the inside surface of the cover member 3 and the top surface of the holding portion 5 of the holding plate 2 abut each other or define therebetween a clearance not greater than the thickness of the disc 100. Preferably, the thickness of the case 1 in its closed condition is not greater than 6 mm.

Figure 4:
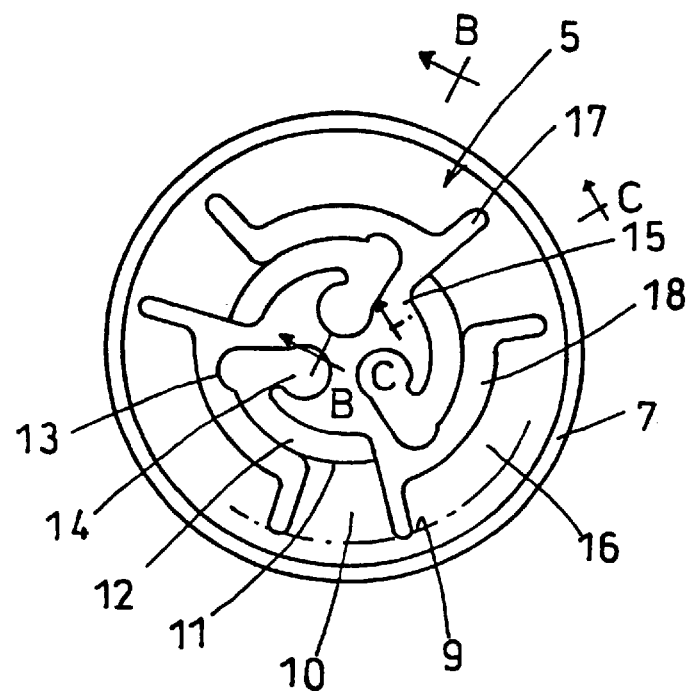
FIG. 4 is an enlarged front elevational view showing a holding portion of a holding plate.

As described above, the storage case 1 of the subject embodiment is composed of two members, namely, the holding plate 2 and the cover member 3, and the holding portion 5 is configured as shown in FIG. 4. These features in combination make the entire thickness of the case 1 extremely small. Conventional storage cases of this type are mostly composed of three members, namely, a pair of cover members and a holding plate interposed therebetween and, hence, the entire thickness of the resulting case is as large as about 10.4 mm. The subject embodiment of the present invention, in contrast, has succesfully thinned the entire thickness of the case 1 to about 5.2 mm, i.e., to a half of the thickness of the conventional case. Although a storage case composed of two members for packaging a CD, DVD or the like is presently known, this case does not have a central holding portion of a configuration similar to the holding portion 5 of the storage case 1, and consequently, there does not exist any such storage case having a thickness as small as a half (about 5.2 mm) of the thickness of the conventional case except the storage case 1 of the present invention. Thus, the aforementioned construction according to the present invention makes it possible to practically realize storage case 1 with 50% reduction in thickness. It should be noted that the storage case 1 can provide sufficient advantages in practice as long as its thickness is not greater than 6 mm. According to the present invention, it is possible to reduce the thickness of the case 1 to even not greater than 5 mm.

The holding plate 2 and the cover member 3 has respective abutting portions 45 (refer to FIG. 1) which come to abut each other when the cover member 3 is opened 180° relative to the holding plate 2, to maintain the open condition. These abutting portions 45 are configured to allow the holding plate 2 and the cover member 3 to pivot further relative to each other when a force is exerted to open the case 1 further than the 180° open condition.

Specifically, these abutting portions 45 comprise the hinge-connected edge portion of the cover member 3 and the side rib 21 on the hinge-connected edge portion of the holding plate 2, the two edge portions being capable of abutting each other.

The peripheral edge 38 located in each of the upper and lower edge portions of the cover member 3 is formed with a label holding claw 46 projecting inwardly therefrom. This holding claw 46 serves to hold a label, a words-printed card or the like.

Figure 27:
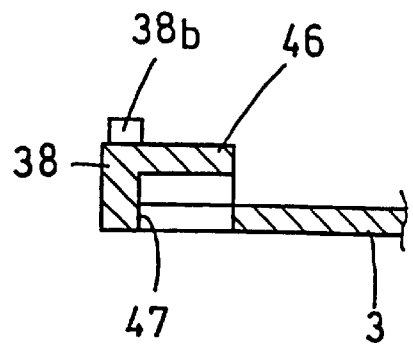
FIG. 27 is a sectional view showing a portion having a label holding claw.

As shown in FIG. 27, the cover member 3 defines a communication aperture 47 extending through the thickness thereof to open upon the label holding claw 46.

The label holding claw 46 is located correspondingly to the second step portion 27 of the peripheral wall 22 of the holding plate 2. Thus, dust entering through the communication aperture 47 is stopped by the peripheral wall 22.

The storage case 1 thus constructed is used as follows.

Figure 8:
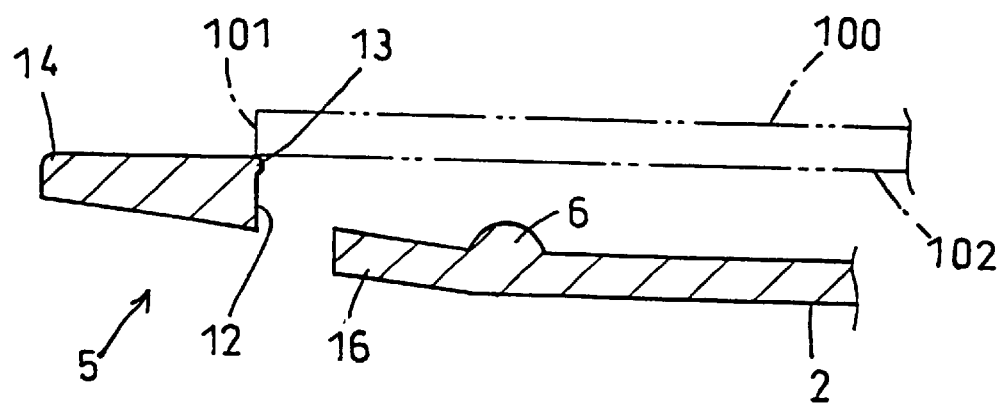
FIG. 8 illustrates a state before fitting the recording medium disc over the holding portion or after having removed the same therefrom.

The cover member 3 is first opened to permit the recording medium disc 100 to be placed in the storage case 1. Then, the disc 100 is put on the upper surface of the projections 13 of the holding portion 5 so that the central hole 101 thereof is positioned properly, as shown in FIG. 8. At this time, the projections 13 located on the outer circumference of the extensions 12 interfere with the periphery of the central hole 101 and, hence, the disc 100 will not be fitted over the holding portion 5 under this condition.

Figure 5:
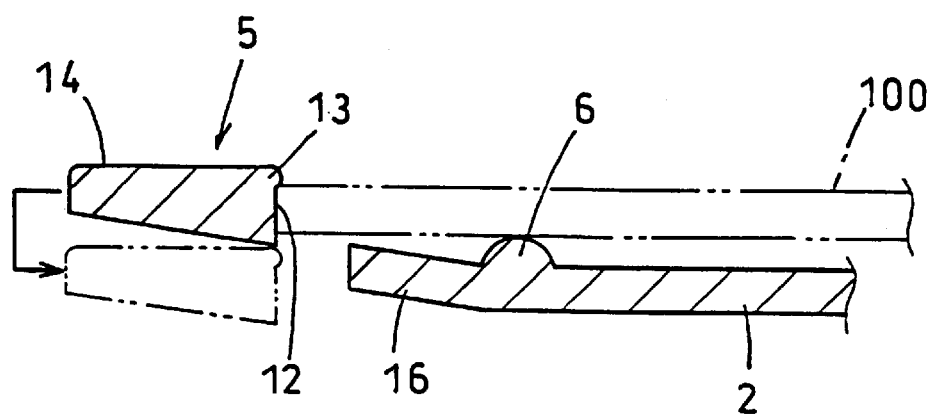
FIG. 5 is an enlarged sectional view taken on line 5—5 in FIG. 4.
Figure 7:
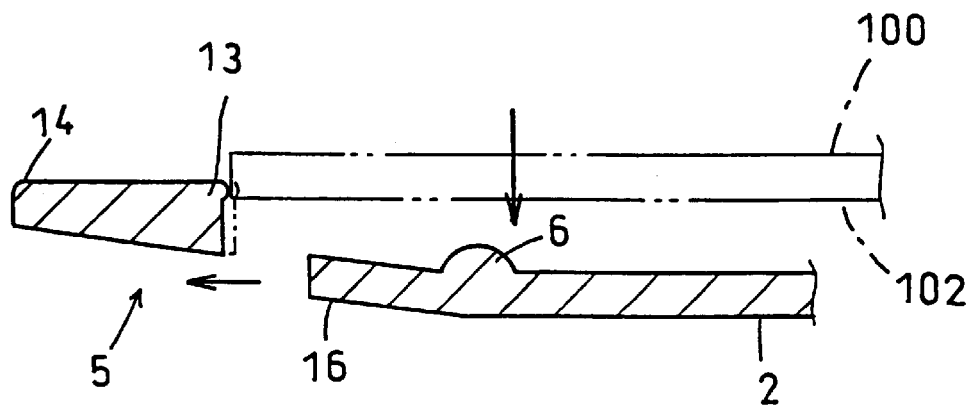
FIG. 7 illustrates a situation where a recording medium disc is to be fitted over the holding portion.

However, depressing the disc 100 only lightly causes the projections 13 to be pressed radially inwardly by the periphery of the central hole 101 as shown in FIG. 7. As a result, the projections 13 pass through the central hole 101 and the disc 100 is securely fitted over the upright portions 11 and extensions 12 as shown in FIGS. 5 and 6. Since the fitting of the disc 100 produces a click sound, the user can confirm the secure fitting of the disc 100 over the holding portion 5.

If a force is exerted to remove the disc 100 from the holding portion 5 in this condition, the upper side of the disc 100 presses on the projections 13 to expand the diameter of the circumference of the extensions 12 thereby preventing unexpected removal of the disc 100 from the holding portion 5.

Subsequently, the cover member 3 is closed. At this time the engagement recess 28 and the corresponding protuberance 40 engage each other to maintain the closed condition. When the cover member 3 is closed, the resulting clearance between the upper side of the disc 100 and the inner surface of the cover member 3 is not greater than the thickness of the disc 100 and, hence, it is unlikely that the disc 100 comes off the holding portion 5 unexpectedly.

The case 1 storing the disc 100 therein may be kept on a storage rack or the like.

In removing the case 1 from the storage rack the case 1 can be easily removed by drawing it out with the finger hook portion 44 hooked by a finger as shown in FIGS. 25 and 26.

On the other hand, in removing the disc 100 from the case 1 the cover member 3 is opened. This opening operation is facilitated if the cover member 3 is gripped at its knurled portion 39 by hand while putting a finger on the finger engaging portion 30.

Since the engagement between the engagement recess 28 and the protuberance 40 on the right and left sides of the case 1 is made even by the positioning protrusion 41 located on each peripheral wall 38 of the cover member 3, the opening operation is further facilitated.

When the cover member 3 is opened 180°, the cover member 3 and the holding plate 2 abut each other at their abutting portions 45 to maintain the 180° open condition. In this case, even if an unexpected external force works to open the case 1 further, the abutting portions 45 are released from their abutting condition to allow the cover member 3 and the holding plate 2 to pivot further relative to each other thereby avoiding damage to the hinge portions 2a and 3a.

After the cover member 3 is opened, the push portions 14 of the holding portion 5 are depressed as shown in FIG. 9. Then, the projections 13 come to abut the inner periphery of the central hole 101 of the disc 100 and this abutment produces a reaction force to cause the diameter of the extensions 12 to be reduced radially inwardly, as shown in phantom in FIG. 5. In this way the diameter of the holding portion as a whole is reduced to cause the projections 13 to shift to the lower side of the disc 100 through the central hole 101. Since a click sound is produced at this time, a release of the disc 100 from the fitting condition can be clearly confirmed.

When the depressing operation on the push portions 14 is stopped after the shifting of the projections 13 to the lower side of the disc 100 through the central hole 101, the diameter of the extensions 12 having once reduced is expanded, so that the disc 100 is supported on the upper surfaces of the projections 13 as shown in FIG. 8. At the same time the upward restoring force of the extensions 12 and base portions 10 causes the disc 100 to be lifted by the projections 13.

Then, the disc 100 can be removed by grasping it with a hand. Thus, a mere one-touch depressing operation relative to the push portions 14 enables removal of the disc 100 according to the present invention.

With a conventional storage case the disc 100 is not readily removed therefrom if the central holding mechanism of the case is depressed in case that the storage case is laid on the flat top of a desk since the elastically deformable range of the central holding mechanism is very limited under the condition where the case is laid on the desk. For this reason it has been a practice in the removal of the disc to depress the central holding mechanism with the conventional case suspended by hand so as to increase the elastically deformable range of the central holding mechanism.

With the storage case 1 of the present invention, in contrast, even if the holding plate 2 is laid on the flat top of a desk, the depressing of the push portions 14 causes the projections 13 to move largely by virtue of the larger elastically deformable range of the base portion 10 and extensions 12 thereby removing the disc 100 with extreme ease.

Figure 28:
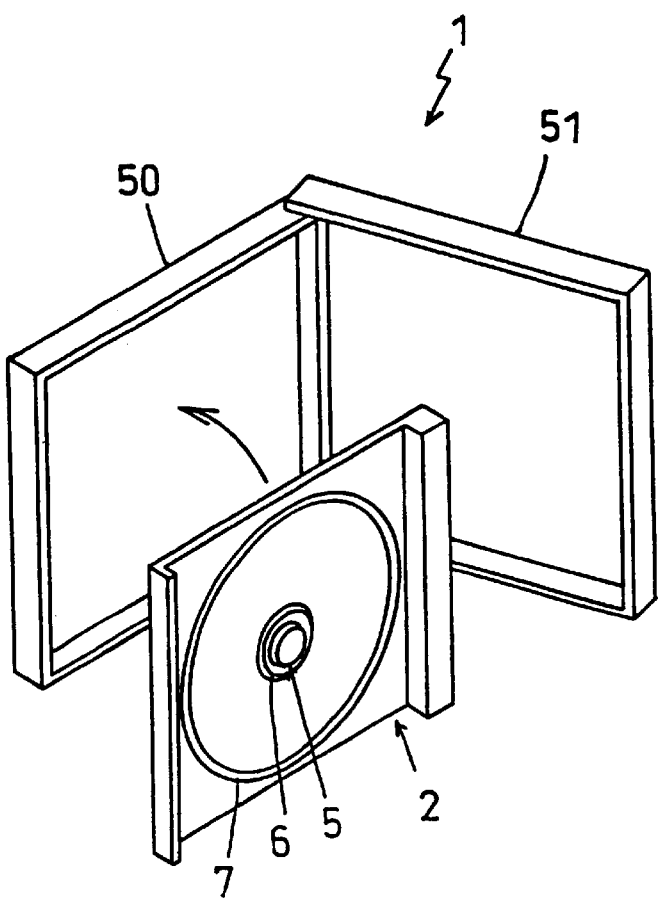
FIG. 28 is a schematic perspective view showing a storage case as a second embodiment of the present invention.

FIG. 28 illustrates a second embodiment of the present invention. In this embodiment, holding plate 2 is formed separately from a pair of cover members 50 and 51 which are pivotally connected to each other for opening and closing. The holding plate 2 is configured so as to be placed on the inner side of one of the cover members 50 and 51 as an insert between these cover members 50 and 51. The holding portion 5 of the holding plate 2 is the same in structure as in the first embodiment.

FIGS. 29 to 38 show different variations of holding portion 5, each of which can replace the holding portion 5 of the first or second embodiment.

Figure 29:
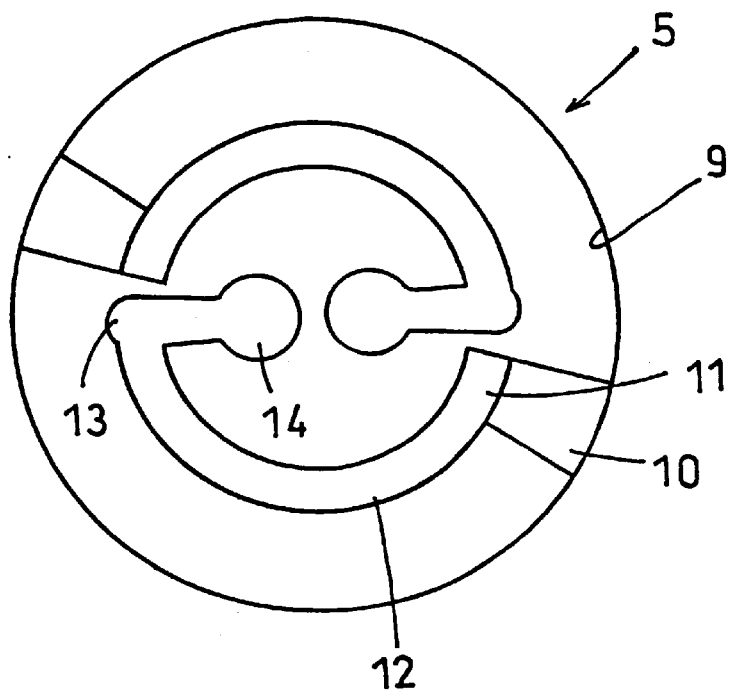
FIGS. 29 to 38 are plan views showing different variations of the holding portion.

Shown in FIG. 29 is a variation having two projections 13, two base portions 10 disposed on the inner periphery of perforation 9 of the holding plate 2 at circumferentially bisecting positions, a semicircular extension 12 extending from the inner end of each base portion 10 through an upright portion 11, and a push portion 15 protruding from an inner peripheral edge of the end portion of the extension 12, each projection 13 being located on an outer peripheral edge of the end portion of the extension 12.

These two projections 13 are situated close to the upright portions 13. This embodiment is not provided with a dust-stop section.

Figure 30:
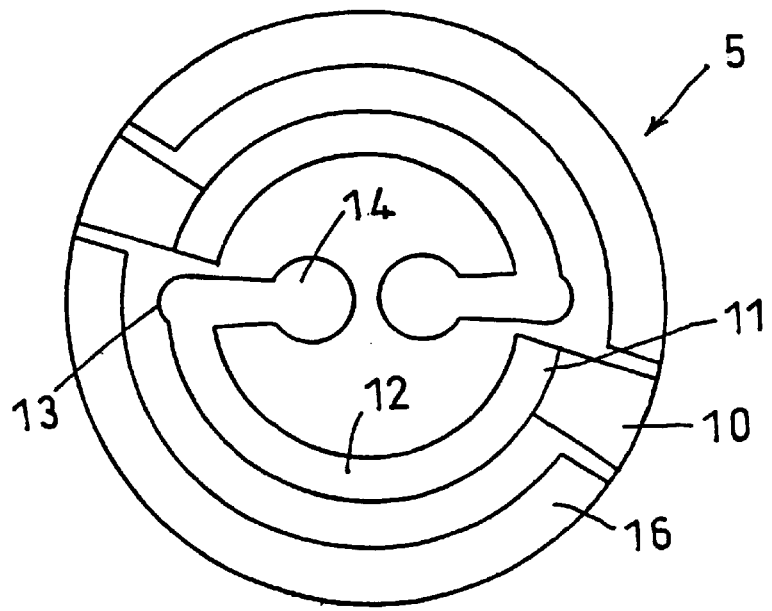

FIG. 30 illustrates another variation similar to that shown in FIG. 29 except that this variation is provided with a dust-stop section 16 on the peripheral edge of perforation 9 defined in holding plate 2.

Figure 31:
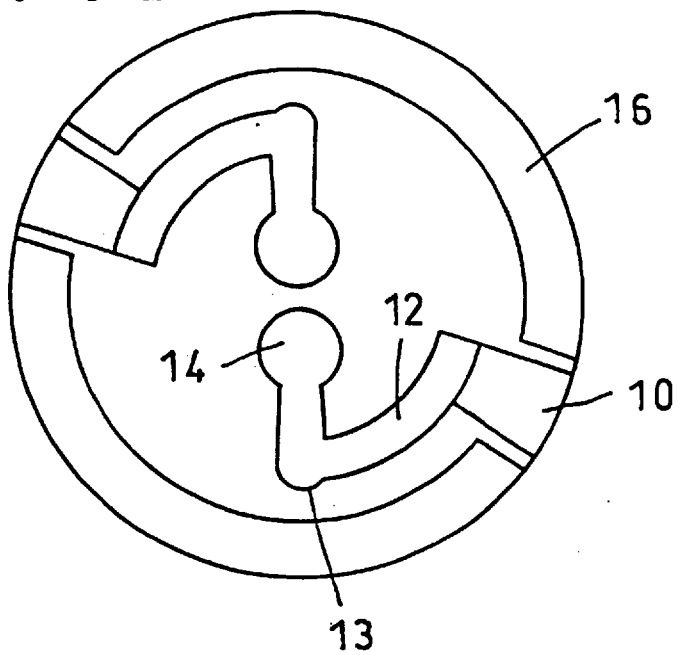
Figure 32:
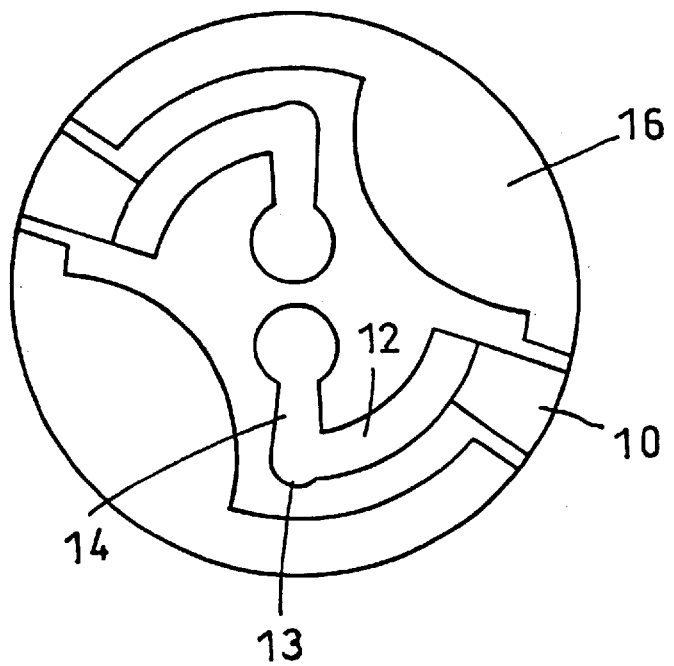

FIG. 31 illustrates a variation in which each extension 12 has a circumferentially extending length as short as about a half of that shown in FIG. 30. On the other hand, FIG. 32 shows a similar variation except for dust-stop section 16 expanded to minimize the open space of perforation 9.

Figure 33:
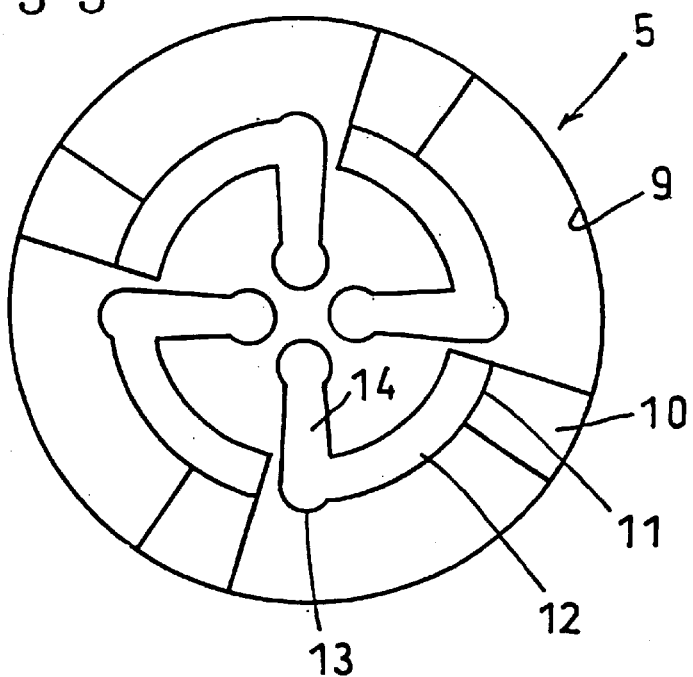
Figure 34:
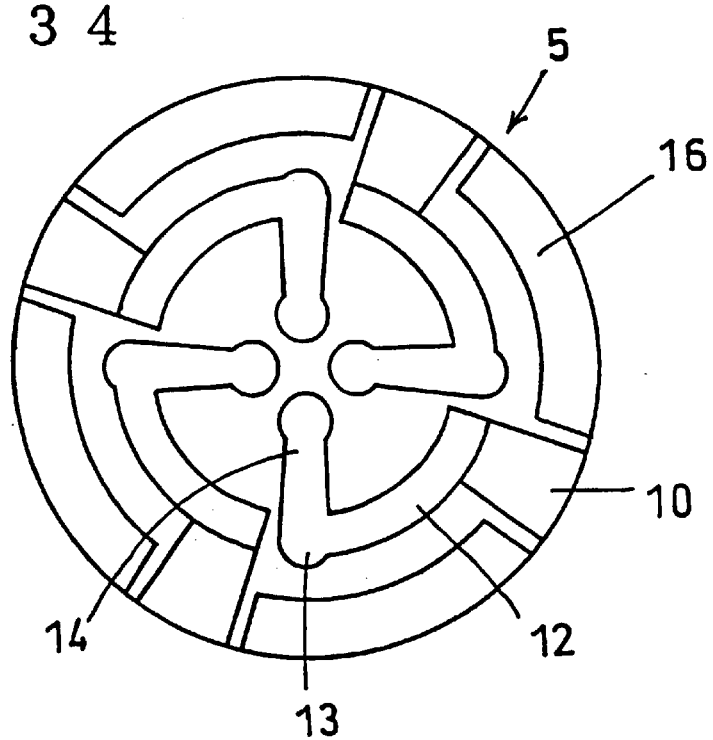

Shown in FIG. 33 is another variation in which the number of projections 13 or like components is four and there is not provided dust-stop section 16. On the other hand, FIG. 34 shows a similar variation except for the provision of dust-stop section 16.

Figure 35:
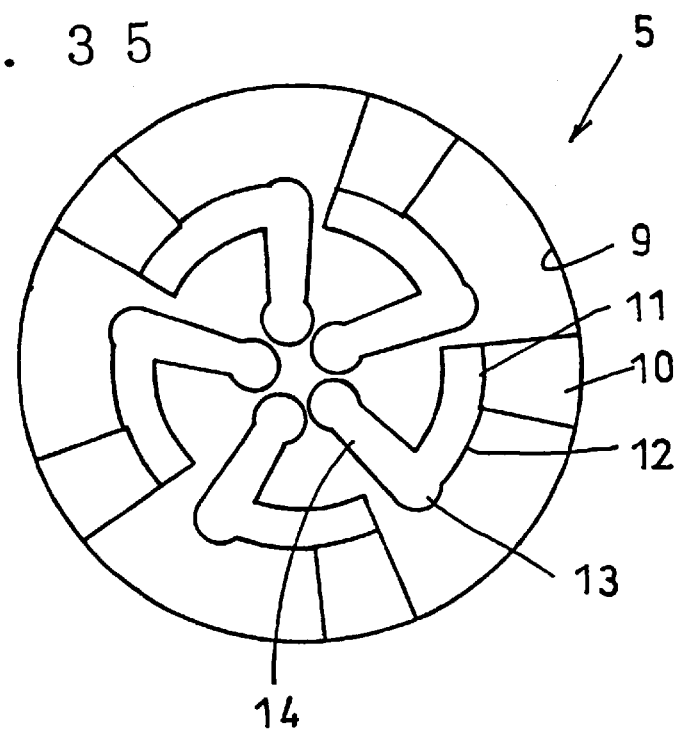
Figure 36:
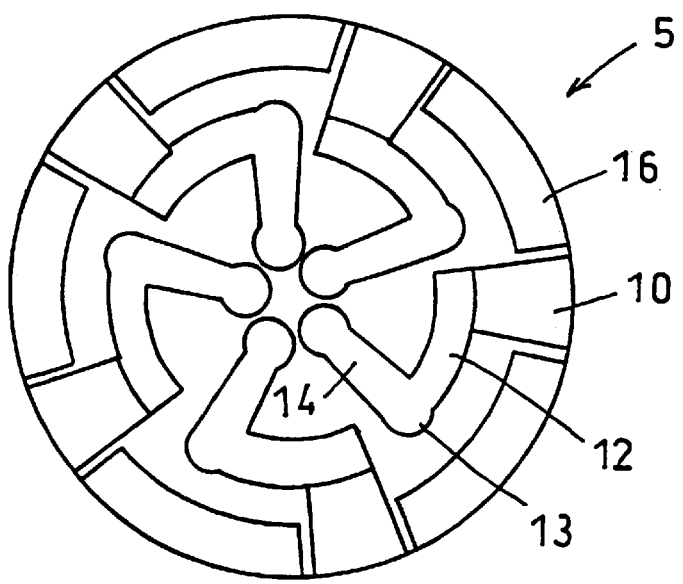

Shown in FIG. 35 is another variation in which the number of projections 13 or like components is five and there is not provided dust-stop section 16. On the other hand, FIG. 36 shows a similar variation except for the provision of dust-stop section 16.

Figure 37:
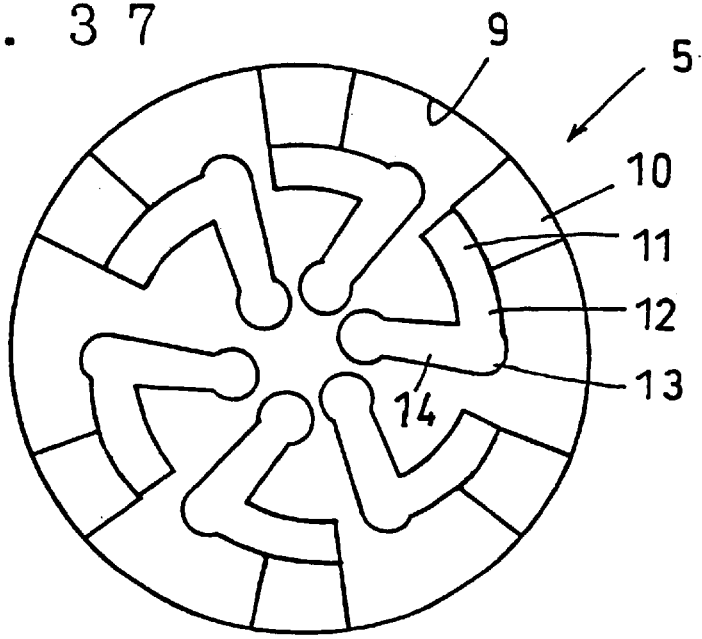
Figure 38:
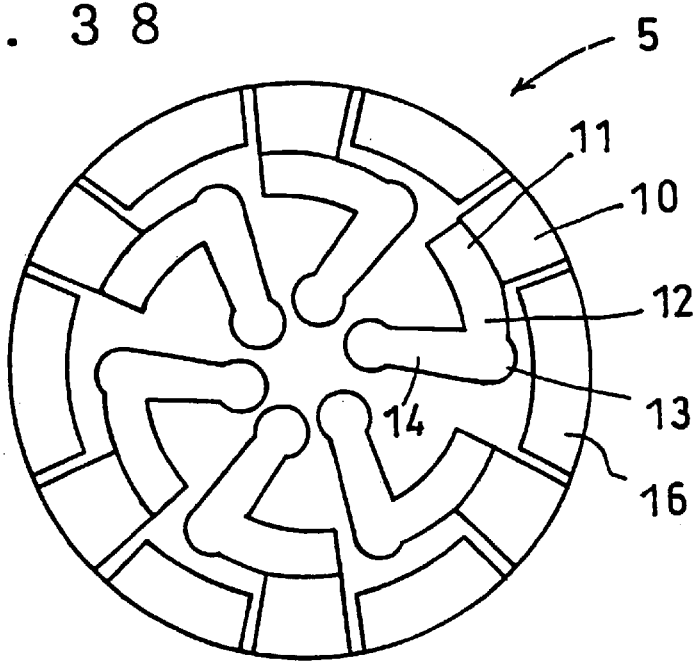

Shown in FIG. 37 is another variation in which the number of projections 13 or like components is six and there is not provided dust-stop section 16. On the other hand, FIG. 38 shows a similar variation except for the provision of dust-stop section 16.

It should be noted that the present invention is not limited to the foregoing embodiments. For example, any one of the support portions 6 and 7 on the holding plate 2 may not be provided. Each of the support portion 6 and 7 is not limited to the annular configuration but may be configured polygonal. Alternatively, they are each configured into a train of small blocks aligned circumferentially of the disc 100.

The disc 100 is not limited to a discoidal configuration but may be configured into a polygon or another shape.

The engagement recess 28 formed in the peripheral edge 22 of the holding plate 2 and the protuberance 40 on the peripheral edge 38 of the cover member 3 may be reversed in location; i.e., the engagement recess 28 may be formed in the peripheral edge 38 of the cover member 3, while the protuberance 40 may be located on the peripheral edge 22 of the holding plate 2. Similarly, the hinge shaft 31 of the hinge portion 2a may be provided on the cover member 3, while the bearing portion supporting the hinge shaft 31 may be provided on the holding portion 2.

The whole configuration including base portions 10, extensions 12 and push portions 14 is not limited to those of the foregoing embodiments but may be volute or spiral.

It should be understood that the preferred embodiments described herein are only illustrative but not limitative of the present invention and that the scope of the invention is defined by the appended claims and, hence, all variations and equivalents within the meanings of the claims are included in the present invention.

INDUSTRIAL APPLICABILITY

The recording medium disc storage case of the present invention is best-suited to store any CD related to computers, game software, music, picture videos and so forth.

What is claimed is:

1. A new recording medium disc storage case comprising a holding plate for covering a side of a recording medium disc having a central hole, said holding plate having a holding portion to be removably fitted into said central hole of said disc, and a cover member pivotally supported on said holding plate through a hinge portion for opening and closing said storage case, said holding plate and said cover member having respective abutting portions which directly abut each other when said cover member is opened 180° relative to said holding plate to maintain the open condition and which are configured to allow said holding plate and cover member to further pivot relative to each other when a force is exerted to open said cover member further from said 180° open condition, wherein said abutting portions comprise a hinge-connected edge portion of the cover member and a side rib on a hinge-connected edge portion of the holding plate.

2. A recording medium disc storage case, comprising:

a holding plate for covering a side of a recording medium disc having a central hole, said holding plate having a holding portion to be removably fitted into said central hole of said disc, a cover member pivotally supported on said holding plate; and a hinge portion pivotally interconnecting said holding plate and said cover for opening and closing said storage case, wherein said cover member has an outer peripheral edge which extends out from an outer peripheral edge of said holding plate when said cover member is in a closed position over said holding plate, and said outer peripheral edge of said cover member is provided with a finger hook portion.

3. A recording medium disc storage case as set forth in claim 2, wherein said holding portion has a top surface which abuts an inner surface of said cover member or defining a clearance less than said thickness of said disc therebetween when said cover member is closed over said holding plate.

4. A compact disk case, comprising:

a top cover and a bottom plate pivotally connected to each other at pivotal edges thereof to provide an inner space for receiving a compact disk therein;

said compact disk case bottom plate including an inner surface, a holding portion, a plurality of protective means and a bottom seat integrally formed on said inner surface such that a compact disk may be positioned in said compact disk case on said bottom plate around said holding portion and on said protective means and said bottom seat, said protective means and top cover being constructed and arranged to prevent an additional compact disk from being stored between said top cover and said bottom plate, wherein said holding portion includes a plurality of flexible ends, said protective means including a low-raised circular rib encircling and being concentric with said holding portion, at least two low-raised curved ribs defining a circle concentric with said holding portion and extending to positions where an outer periphery of a compact disk will rest and a plurality of upwardly extending curved ribs closely located at and extending along an outer side of said low-raised curved ribs and said plurality of upwardly extending curved ribs having a height slightly higher than that of said low-raised curved ribs, wherein said top cover includes a plane surface defining a first top cover end, a second top cover end, and two lateral sides, two side walls being separately formed along said two lateral sides of said top cover to vertically extend downward by a predetermined distance, semicircular members being symmetrically provided on said two side walls at suitable positions close to said first and said second top ends of said top cover, such that said semicircular members at two opposite sides of said top cover project inward toward one another, a portion of said top cover near said rear end having a slightly narrowed width, and a rear wall extending along said portion of said top cover connected to first and second short wings, said rear wall and said first and second short wings vertically extending downward by a predetermined small distance, and a pivotal hole being provided on each of said short wings; and said bottom plate including a plane surface defining a first bottom plate end, a second bottom plate end, and two lateral sides, said bottom plate being provided at said second bottom plate end of each of said two lateral sides with an extended arm, each of said extended arms being provided at an inner side with a protrusion corresponding to said pivotal holes on said two wings of said top cover, such that said top cover may be pivotally connected at said second top cover end to said bottom plate by separately extending said two protrusions into said two pivotal holes, two walls being provided on an inner side of said bottom plate to separately horizontally extend along said first bottom plate end and said second bottom plate end, each of said walls connected to first and second short wing portions, dust-proof recesses being symmetrically provided on said two lateral sides of said bottom plate within said two first and second short wing portions and corresponding to said semicircular members on said top cover.

5. The case of claim 4, wherein said plurality of flexible ends form a substantially circular array which has a diameter greater than that of said central hole of the disc.

6. The case of claim 4, wherein said first top cover end comprises one of a free end and a front end.

7. The case of claim 4, wherein said second top cover end comprises one of a pivotal end and a rear end.

8. The case of claim 4, wherein said first bottom plate end comprises one of a free end and a front end.

9. The case of claim 4, wherein said second bottom plate comprises one of a pivotal end and a rear end.

10. A recording medium disc storage case as set forth in claim 2, wherein the finger hook portion includes a peripheral wall extending in the thickness direction of the case out from the outer peripheral edge of the cover member on the hinged side and a peripheral wall extending in the thickness direction of the case out from the outer peripheral edge of the holding plate on the hinged side, the peripheral walls both extending whole width of the case, the walls being disposed with a clearance allowing a finger to be inserted therebetween, the peripheral wall of the cover member having opposite ends connected to the hinge portion.

* * * * *